US012791735B2

(12) United States Patent
Lee et al.

(10) Patent No.: US 12,791,735 B2
(45) Date of Patent: Nov. 10, 2026

(54) DYNAMIC GNSS CHANNEL CONTROL

(71) Applicant: QUALCOMM Incorporated, San Diego, CA (US)

(72) Inventors: Dong Kyeong Lee, San Jose, CA (US); Songwon Jee, San Jose, CA (US); William Morrison, San Francisco, CA (US); Himanshu Shah, Milpitas, CA (US); Bo Zheng, Sunnyvale, CA (US); Hsiao Chien Liang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 18/753,647

(22) Filed: Jun. 25, 2024

(65) Prior Publication Data

US 2025/0389850 A1 Dec. 25, 2025

(51) Int. Cl.
*G01S 19/28* (2010.01)

(52) U.S. Cl.
CPC .................................... *G01S 19/28* (2013.01)

(58) Field of Classification Search
CPC ....................................................... G01S 19/28
See application file for complete search history.

(56) References Cited

U.S. PATENT DOCUMENTS 6,392,593 B1 * 5/2002 Pemble ................... G01S 19/34 342/357.67
2001/0048387 A1 * 12/2001 Sheynblat ............... G01S 19/06 342/357.67
2003/0231132 A1 * 12/2003 Park ........................ G01S 19/28 342/357.67
2004/0041729 A1 * 3/2004 Rowitch ................. G01S 19/28 342/357.25
2006/0152409 A1 * 7/2006 Raman .................... G01S 19/24 342/357.48
2009/0002234 A1 1/2009 Normark et al.
2009/0079630 A1 * 3/2009 Baba ...................... G04R 60/12 368/14
2013/0162468 A1 6/2013 Kim et al.
2016/0124070 A1 5/2016 Afzal et al.

OTHER PUBLICATIONS

International Search Report and Written Opinion—PCT/US2025/027211—ISA/EPO—Jul. 25, 2025.

* cited by examiner

*Primary Examiner* — Cassi J Galt
(74) *Attorney, Agent, or Firm* — Weaver Austin Villeneuve & Sampson LLP

(57) ABSTRACT

A method of controlling a satellite positioning system receiver of a mobile device includes: determining, at the mobile device, candidate satellite vehicle positioning signals corresponding to satellite vehicles above a horizon relative to the mobile device; determining, based on at least one respective satellite vehicle signal parameter for each of the candidate satellite vehicle positioning signals, a subset of satellite vehicle positioning signals consisting of fewer than all of the candidate satellite vehicle positioning signals; and causing each satellite signal channel in at least a subset of a plurality of satellite signal channels of the satellite positioning system receiver to measure a corresponding satellite vehicle positioning signal of the subset of satellite vehicle positioning signals.

18 Claims, 8 Drawing Sheets

610

| Candidate SV signal ID | Metric value |
|---|---|
| ID1 | MV1 |
| ID2 | MV2 |
| ID3 | MV3 |
| ID4 | MV4 |
| ID5 | MV5 |
| ID6 | MV6 |
| • | • |
| ID49 | MV49 |
| ID50 | MV50 |
| ID51 | MV51 |
| ID52 | MV52 |
| • | • |
| ID(N-2) | MV(N-2) |
| ID(N-1) | MV(N-1) |
| ID(N) | MV(N) |

620

| GNSS channel | Candidate SV signal ID |
|---|---|
| GC1 | ID1 |
| GC2 | ID2 |
| GC3 | ID3 |
| GC4 | ID4 |
| GC51 | ID5 |
| GC6 | ID6 |
| GC49 | ID49 |
| GC50 | ID50 |
| • | • |

630

| | |
|---|---|
| GC78 | ID78 |
| GC79 | ID79 |
| GC80 | ID80 |

FIG. 6

| Line | # of samples | # of fixes |
|---|---|---|
| 710 | 10 | 101402 |
| 720 | 20 | 128867 |
| 730 | 40 | 129748 |
| 740 | 60 | 129770 |
| 750 | 1000 | 129777 |

DYNAMIC GNSS CHANNEL CONTROL

BACKGROUND

Positions of devices, such as mobile devices, may be determined using terrestrial-based positioning signals and/or satellite positioning signals. An SPS (satellite positioning system) receiver (also called a GNSS (Global Navigation Satellite System) receiver) may be used to measure satellite signals from a GNSS such as the Global Positioning System (GPS), the Global Navigation Satellite System (GLONASS), Galileo, or Beidou or some other local or regional SPS (Satellite Positioning System) such as the Indian Regional Navigational Satellite System (IRNSS), the European Geostationary Navigation Overlay Service (EGNOS), the Quasi-Zenith Satellite System (QZSS, also called Michibiki), or the Wide Area Augmentation System (WAAS). SPS receivers may be included in various devices for receiving and measuring satellite positioning signals. Measurements of the satellite positioning signals may be processed to determine position information, such as ranges between satellites and the receiver and/or a position estimate for the receiver.

SPS receivers may support tracking multiple GNSS signals concurrently, but may have a limited number of signals that can be concurrently tracked. A SPS receiver may attempt to search for satellite vehicle (SV) signals from SVs that are above the horizon based on a coarse position estimate of the SPS receiver. There may be many such SVs, and an SV may transmit more than one SV signal (e.g., in different frequency bands) such that there may be well over 100 SV signals that a SPS receiver could theoretically track, if the SPS receiver has sufficient SV signal searching/tracking resources. SV signals may be referred to as SV positioning signals and are signals that may be measured to determine time of travel between respective satellites and a receiver in order to determine ranges between the satellites and the receiver to determine a position fix of the receiver using trilateration. A satellite signal channel (which may be called, for example, a GNSS channel) is a unit of resource capacity to search/track a single GNSS signal within a time-frequency window at a specified resolution. For example, a high-resolution search (with a small number of GNSS chips searched) may be performed over a small time-frequency search window, or a low-resolution search (with a large quantity of GNSS chips searched) may be performed over a very broad time-frequency search window. A SPS receiver has a limited (although perhaps a high, e.g., 100 or more) quantity of satellite signal channels.

Even in dense urban locations, where the view of the sky from a SPS receiver is at least partially blocked, many satellite vehicles (SVs) of various satellite constellations may be observed by the SPS receiver. For example, 70 or more SVs may often be observed even in dense urban locations. In open sky, with few if any objects blocking the view of the sky by a SPS receiver, there may be many more SVs visible to the SPS receiver.

Referring to FIGS. 1A and 1B, a navigation environment 100 includes a user 105 carrying a mobile device 110 that includes a SPS receiver for tracking SV signals from SVs such as SVs 121, 122, 123, 124 (e.g., signals 141, 143 from the SVs 121, 123). The environment 100 is an urban environment containing buildings 131, 132 (and other objects not shown). A sky plot 150 shows a polar coordinate plot of a distribution of SVs that are above the horizon (indicated by a circle 160) corresponding to the location of the mobile device 110. In the sky plot 150, each dot represents an SV. Different SVs may be characterized based on the quality and/or the usability of the corresponding SV signals for determining a location of the mobile device 110. For example, SVs in a region 170 may be determined to be particularly good SVs, corresponding to SV signals with high-quality signal reception, e.g., due to the SVs in the region 170 being in line of sight (LOS) with the mobile device 110. Within the region 170, a region 180 may contain SVs for which SV signals are of high quality and redundant with other high-quality SV signals. As another example, SVs in a region 190 may be determined to be poor SVs, corresponding to SV signals with no signal reception or low-quality signal reception, e.g., due to the SVs in the region 190 being non-line of sight (NLOS) with the mobile device 110 (e.g., such that signals received have been reflected (i.e., are multipath signals)). Often, SVs of similar characterization (good, poor, redundant, etc.) are geographically correlated due to SV signals from SVs in similar portions of the sky experiencing similar paths to the mobile device 110. The regions 170, 180, 190 are all shown as circles, but other shapes of boundaries may be used to define regions of SVs with similar characterizations. SVs characterized as good correspond to SV signals with high-quality signal reception and that are distributed within the plot 150. SVs characterized as redundant may correspond to signals with high-quality reception, but the SVs may not be significantly distributed within the plot 150 such that the SV signals from these SVs may not significantly contribute to a location solution for the mobile device 110.

SUMMARY

An example method of controlling a satellite positioning system receiver of a mobile device includes: determining, at the mobile device, candidate satellite vehicle positioning signals corresponding to satellite vehicles above a horizon relative to the mobile device; determining, based on at least one respective satellite vehicle signal parameter for each of the candidate satellite vehicle positioning signals, a subset of satellite vehicle positioning signals consisting of fewer than all of the candidate satellite vehicle positioning signals; and causing each satellite signal channel in at least a subset of a plurality of satellite signal channels of the satellite positioning system receiver to measure a corresponding satellite vehicle positioning signal of the subset of satellite vehicle positioning signals.

An example mobile device includes: at least one memory; a satellite positioning system receiver comprising a plurality of satellite signal channels each comprising a combination of components to receive and measure a satellite vehicle positioning signal; at least one controller, communicatively coupled to the at least one memory and the satellite positioning system receiver, configured to: determine candidate satellite vehicle positioning signals corresponding to satellite vehicles above a horizon relative to the mobile device; determine, based on at least one respective satellite vehicle signal parameter for each of the candidate satellite vehicle positioning signals, a subset of satellite vehicle positioning signals consisting of fewer than all of the candidate satellite vehicle positioning signals; and cause each satellite signal channel in at least a subset of the plurality of satellite signal channels to measure a corresponding satellite vehicle positioning signal of the subset of satellite vehicle positioning signals.

Another example mobile device includes: a satellite positioning system receiver comprising a plurality of satellite signal channels each comprising a combination of components to receive and measure a satellite vehicle positioning signal; means for determining candidate satellite vehicle positioning signals corresponding to satellite vehicles above a horizon relative to the mobile device; means for determining, based on at least one respective satellite vehicle signal parameter for each of the candidate satellite vehicle positioning signals, a subset of satellite vehicle positioning signals consisting of fewer than all of the candidate satellite vehicle positioning signals; and means for causing each satellite signal channel in at least a subset of the plurality of satellite signal channels of the satellite positioning system receiver to measure a corresponding satellite vehicle positioning signal of the subset of satellite vehicle positioning signals.

An example non-transitory, processor-readable storage medium includes processor-readable instructions to cause at least one processor of a mobile device to: determine candidate satellite vehicle positioning signals corresponding to satellite vehicles above a horizon relative to the mobile device; determine, based on at least one respective satellite vehicle signal parameter for each of the candidate satellite vehicle positioning signals, a subset of satellite vehicle positioning signals consisting of fewer than all of the candidate satellite vehicle positioning signals; and cause each satellite signal channel in at least a subset of a plurality of satellite signal channels of a satellite positioning system receiver of the mobile device to measure a corresponding satellite vehicle positioning signal of the subset of satellite vehicle positioning signals.

BRIEF DESCRIPTION OF THE DRAWINGS

FIG. 6 is a block diagram of ranked candidate satellite vehicle signals and GNSS assigned to measure some of the ranked candidate satellite vehicle signals.

DETAILED DESCRIPTION

Figure 1A:
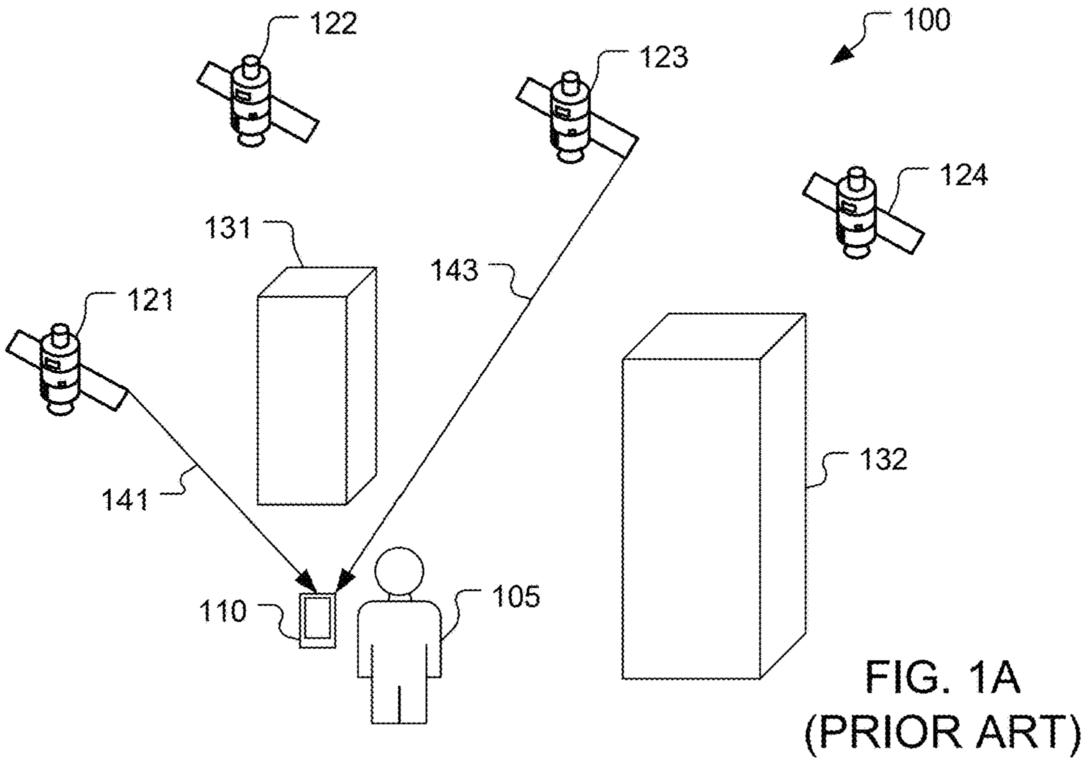
FIG. 1A (PRIOR ART)
FIG. 1A is a simplified diagram of an example navigation environment.

Techniques are discussed herein for selectively measuring/tracking candidate satellite vehicle positioning signals. For example, potentially-visible satellite vehicles (satellite vehicles above a horizon) may be identified. A subset of satellite vehicle signals transmitted by the potentially-visible satellite vehicles may be dynamically and intelligently selected (e.g., eliminating multipath signals and/or redundant signals). The subset of satellite vehicle signals may be selected based on a ranking of at least some of the satellite vehicle signals transmitted by the potentially-visible satellite vehicles. A quantity of signals in the subset of satellite vehicle signals may be limited to an available quantity of GNSS channels (Global Navigation Satellite System channels) of a mobile device, or even fewer than the available quantity of GNSS channels of the mobile device. Measurement of satellite vehicle signals may be limited to the selected subset of satellite vehicle signals. These are examples, and other implementations may be used. For example, a subset of satellite vehicle signals to track may be determined that meet a channel search threshold based on recently-measured satellite vehicle signal parameters (e.g., obtained from a fast/coarse search of satellite vehicle signals) and previously-measured satellite vehicle signal parameters. The subset of satellite vehicle signals may be measured. The satellite vehicle signals in the subset may be ranked and a deep search for each satellite vehicle signal in the subset performed in the order of the satellite vehicle signals in the ranked subset. Still other implementations may be used.

Items and/or techniques described herein may provide one or more of the following capabilities, as well as other capabilities not mentioned. For example, limited GNSS (Global Navigation Satellite System) channels may be dynamically allocated. Position fixes may be obtained for a mobile device using fewer GNSS channels than previous devices, e.g., fewer GNSS channels than for attempting to measure all potentially in-view satellite vehicles, without significantly reducing position fix accuracy, or even improving position fix accuracy. Cost of manufacturing and/or operating a mobile device may be reduced (e.g., battery life improved) without significantly reducing position fix accuracy, or even improving position fix accuracy. Other capabilities may be provided and not every implementation according to the disclosure must provide any, let alone all, of the capabilities discussed.

Obtaining the locations of mobile devices may be useful for many applications including, for example, emergency calls, personal navigation, consumer asset tracking, locating a friend or family member, etc. Mobile devices and/or SPS receivers may be embodied by any of a number of types of devices including but not limited to printed circuit (PC) cards, compact flash devices, external or internal modems, wireless or wireline phones, smartphones, tablets, consumer asset tracking devices, asset tags, and so on. Existing positioning methods for determining locations of mobile devices include methods based on measuring radio signals transmitted from a variety of devices or entities including satellite vehicles (SVs) and terrestrial radio sources in a wireless network such as base stations and access points.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

Figure 2:
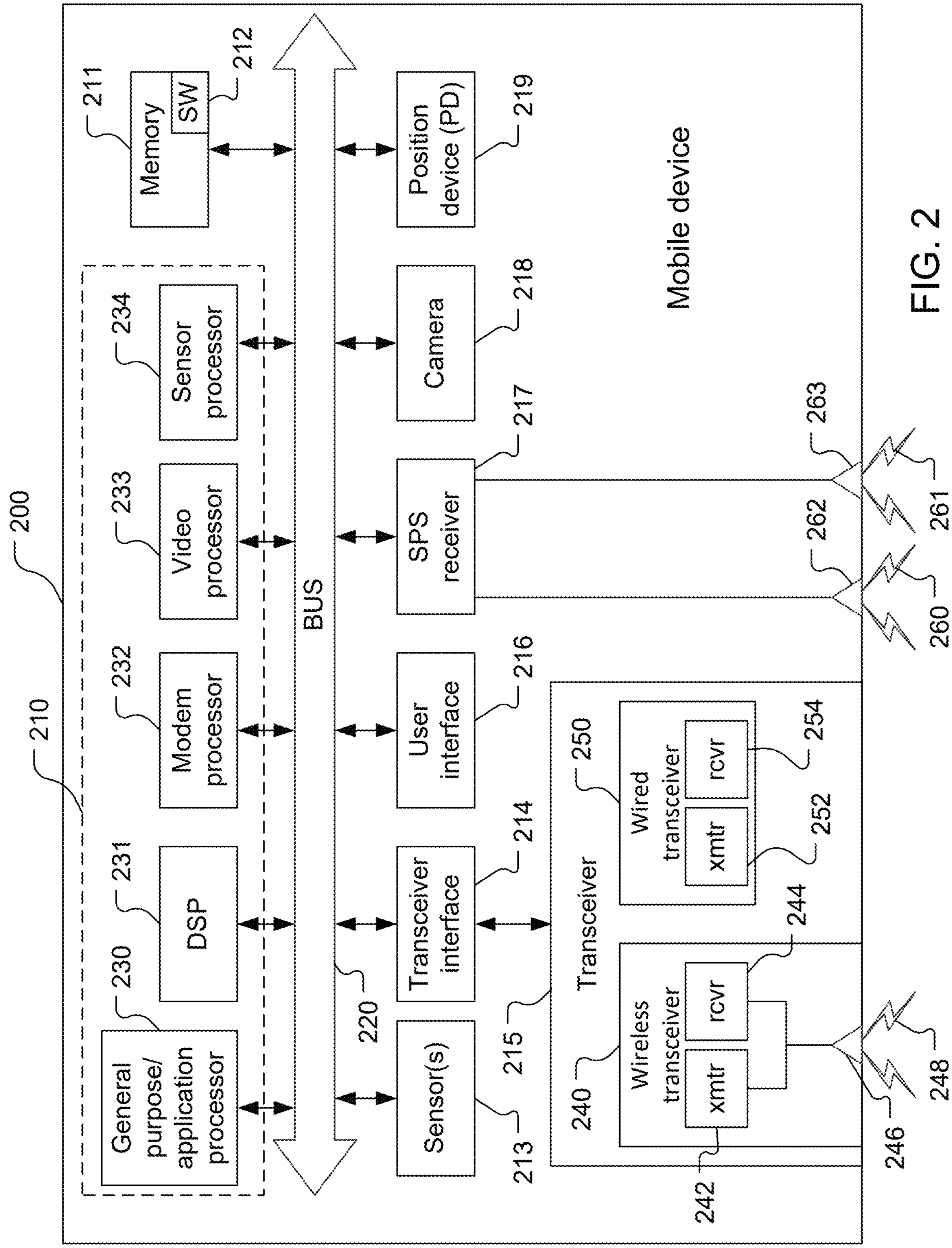
FIG. 2 is a block diagram of components of an example mobile.

Referring to FIG. 2, a mobile device 200 may comprise a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a SPS receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the mobile device 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the mobile device 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the mobile device 200 performing a function as shorthand for one or more appropriate components of the mobile device 200 performing the function. The processor 210 may include a memory with stored instructions in addition to and/or instead of the memory 211. Functionality of the processor 210 is discussed more fully below.

The mobile device 200 may be any of a variety of devices. For example, the mobile device may be a smartphone, a tablet computer, a laptop computer, a consumer asset tracking device, or any other device (known or developed in the future) for which determining a location of the mobile device using SV signals may be desired.

The configuration of the mobile device 200 shown in FIG. 2 is an example and not limiting of the disclosure, including the claims, and other configurations may be used. For example, an example configuration of the UE includes one or more of the processors 230-234 of the processor 210, the memory 211, the SPS receiver 217, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250. Still other configurations may be used.

The mobile device 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with a radio access network (RAN). The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 217 (e.g., a Global Positioning System (GPS) receiver) may be capable of receiving and acquiring SPS signals 260, 261 via SPS antennas 262, 263, respectively (although a SPS receiver configuration with a single antenna, or more than two antennas, may be used). The antennas 262, 263 are configured to transduce the wireless SPS signals 260, 261, e.g., of different frequencies, to wired signals, e.g., electrical or optical signals, and may be integrated with the antenna 246. The SPS receiver 217 may be configured to process, in whole or in part, the acquired SPS signals 260, 261 for estimating a location of the mobile device 200. For example, the SPS receiver 217 may be configured to determine location of the mobile device 200 by trilateration using the SPS signals 260, 261. The general-purpose processor 230, the memory 211, the DSP 231 and/or one or more specialized processors (not shown) may be utilized to process acquired SPS signals, in whole or in part, and/or to calculate an estimated location of the mobile device 200, in conjunction with the SPS receiver 217. The memory 211 may store indications (e.g., measurements) of the SPS signals 260, 261 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the mobile device 200.

The position device (PD) 219 may be configured to determine a position of the mobile device 200, motion of the mobile device 200, and/or relative position of the mobile device 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the mobile device 200 using terrestrial-based signals (e.g., at least some of the signals 248) for trilateration, for assistance with obtaining and using the SPS signals 260, 261, or both. The PD 219 may be configured to use one or more other techniques (e.g., relying on the UE's self-reported location (e.g., part of the UE's position beacon)) for determining the location of the mobile device 200, and may use a combination of techniques (e.g., SPS and terrestrial positioning signals) to determine the location of the mobile device 200. The PD 219 may include one or more of the sensors 213 (e.g., gyroscope(s), accelerometer(s), magnetometer(s), etc.) that may sense orientation and/or motion of the mobile device 200 and provide indications thereof that the processor 210 (e.g., the processor 230 and/or the DSP 231) may be configured to use to determine motion (e.g., a velocity vector and/or an acceleration vector) of the mobile device 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the mobile device 200, and may be provided by hardware, software, firmware, or various combinations thereof.

Figure 3:
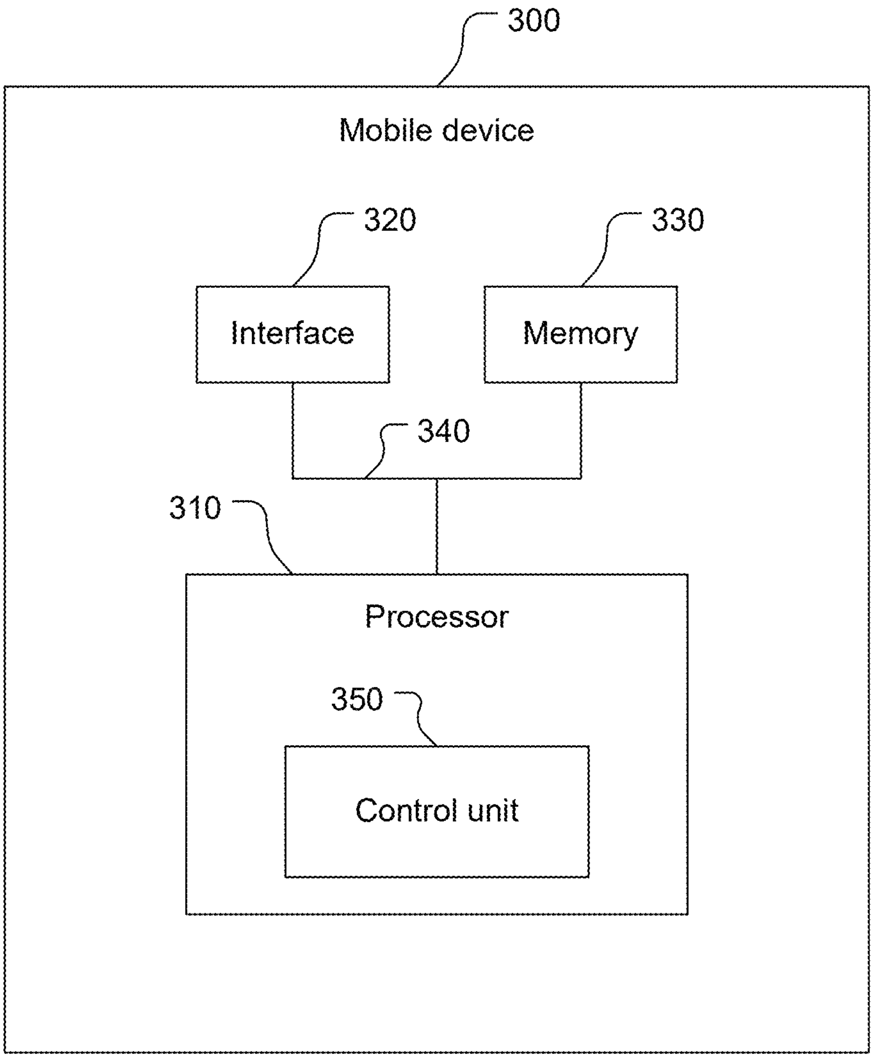
FIG. 3 is a block diagram of an example mobile device.

Referring also to FIG. 3, a mobile device 300 includes a processor 310, an interface 320, and a memory 330 communicatively coupled to each other by a bus 340. The mobile device 300 may include some or all of the components shown in FIG. 3, and may include one or more other components such as any of those shown in FIG. 2 such that the mobile device 200 may be an example of the mobile device 300. The processor 310 may include one or more components of the processor 210. The interface 320 may include the SPS receiver 217 and one or more of the antennas 262, 263 to receive and process satellite signals, e.g., satellite signals of different frequencies (e.g., from different frequency bands). The interface 320 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 320 may include the wired transmitter 252 and/or the wired receiver 254. The memory 330 may be configured similarly to the memory 211, e.g., including software with processor-readable instructions configured to cause the processor 310 to perform functions.

The description herein may refer only to the processor 310 performing a function, but this includes other implementations such as where the processor 310 executes software (stored in the memory 330) and/or firmware. The description herein may refer to the mobile device 300 performing a function as shorthand for one or more appropriate components (e.g., the processor 310 and the memory 330) of the mobile device 300 performing the function. The processor 310 (possibly in conjunction with the memory 330 and, as appropriate, the interface 320) includes a control unit 350. The control unit 350 may be configured to perform one or more functions for controlling which SV signals are searched for and/or tracked by GNSS channels of the mobile device 300.

Figure 1B:
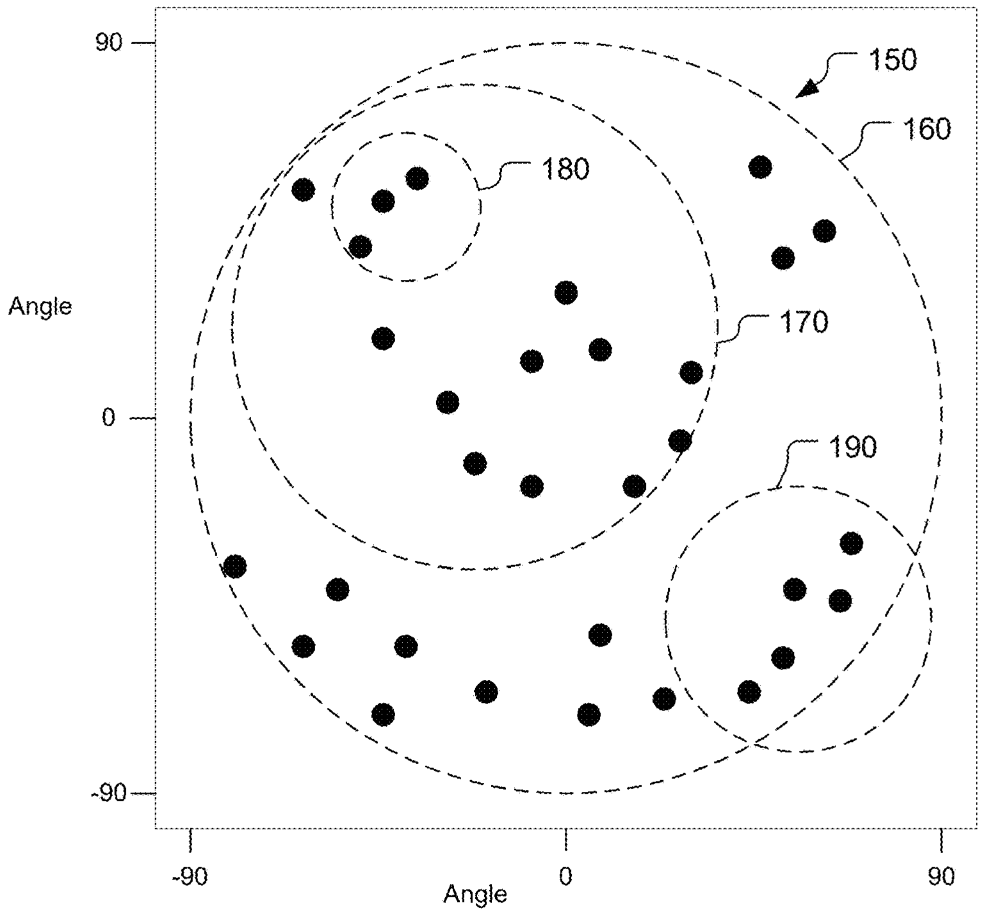
FIG. 1B (PRIOR ART)
FIG. 1B is a sky plot of potentially-visible satellite vehicles.

The interface 320, e.g., the SPS receiver 217, may have the capacity to search two-dimensional space (e.g., to form the sky plot 150 shown in FIG. 1) in accordance with time-frequency windows of defined resolutions. A quantity of SV signals transmitted by SVs that are above the horizon at any given time will exceed the number of SV signals needed to meet an expected performance, e.g., position fix accuracy. The interface 320 has a fixed quantity of GNSS channels that may be used to search and track SV signals, and this quantity of GNSS channels may be fewer than the quantity of SV signals transmitted by SVs that are above the horizon, even if the signals are limited to signals of high reception quality. Using GNSS channels of the interface 320 to track redundant GNSS signals uses processing power and time without significantly improving position fix accuracy. Indeed, measurements of redundant SV signals may be discarded, thus wasting processing power used to measure the redundant SV signals. Also, use of poor SV signals (e.g., multipath SV signals and/or SV signals with un-modeled error (e.g., non-linear error)) may degrade performance (e.g., position fix accuracy and possibly power consumption). A cost (e.g., an AUC (average unit cost)) to make a mobile device with enough GNSS channels to search and track all in-view SVs (i.e., all SVs above the horizon relative to the mobile device and thus all potentially in-view SVs) may be higher than a cost of a mobile device with fewer GNSS channels (e.g., due to more hardware (e.g., more memory) to make the former mobile device). Also, a cost to operate (e.g., power consumption) a mobile device with enough GNSS channels to search and track all in-view SVs may be higher than a cost to operate a mobile device with fewer GNSS channels. Thus, the cost to make and/or operate a mobile device may be decreased relative to a mobile device with enough GNSS channels to search and track all in-view SVs without significantly affecting position fix accuracy of the mobile device.

The control unit 350 may be configured to allocate GNSS channels of the mobile device 300 for acquiring and/or tracking SV signals. The control unit 350 may dynamically and intelligently select SV signals (e.g., applying an algorithm such as a heuristic algorithm, or a machine-learning model, or another statistical model or algorithmic model) to measure and/or track, and dynamically and intelligently assign GNSS channels to respective SV signals. For example, the control unit 350 may assign GNSS channels up to the number of identified SV signals for measurement/tracking or up to the number of GNSS channels of the mobile device 300, whichever is smaller. As another example, the control unit 350 may assign fewer than all GNSS channels of the mobile device 300, e.g., assigning GNSS channels only for SV signals meeting (or expected to meet) one or more criteria (e.g., received signal strength above a threshold signal strength and/or elevation of a corresponding SV relative to the mobile device 300 being above a threshold elevation (which corresponds to a higher likelihood of being LOS with the mobile device 300), etc.). By having the control unit 350 able to intelligently select GNSS channels for SV signal measurement and/or tracking, the mobile device 300 may be made with a reduced quantity of GNSS channels relative to other devices, allowing the mobile device 300 to have a lower AUC and/or to use less power and/or use less processing resources to obtain position fixes with acceptable accuracy (e.g., a horizontal position error below a threshold distance).

Figure 4:
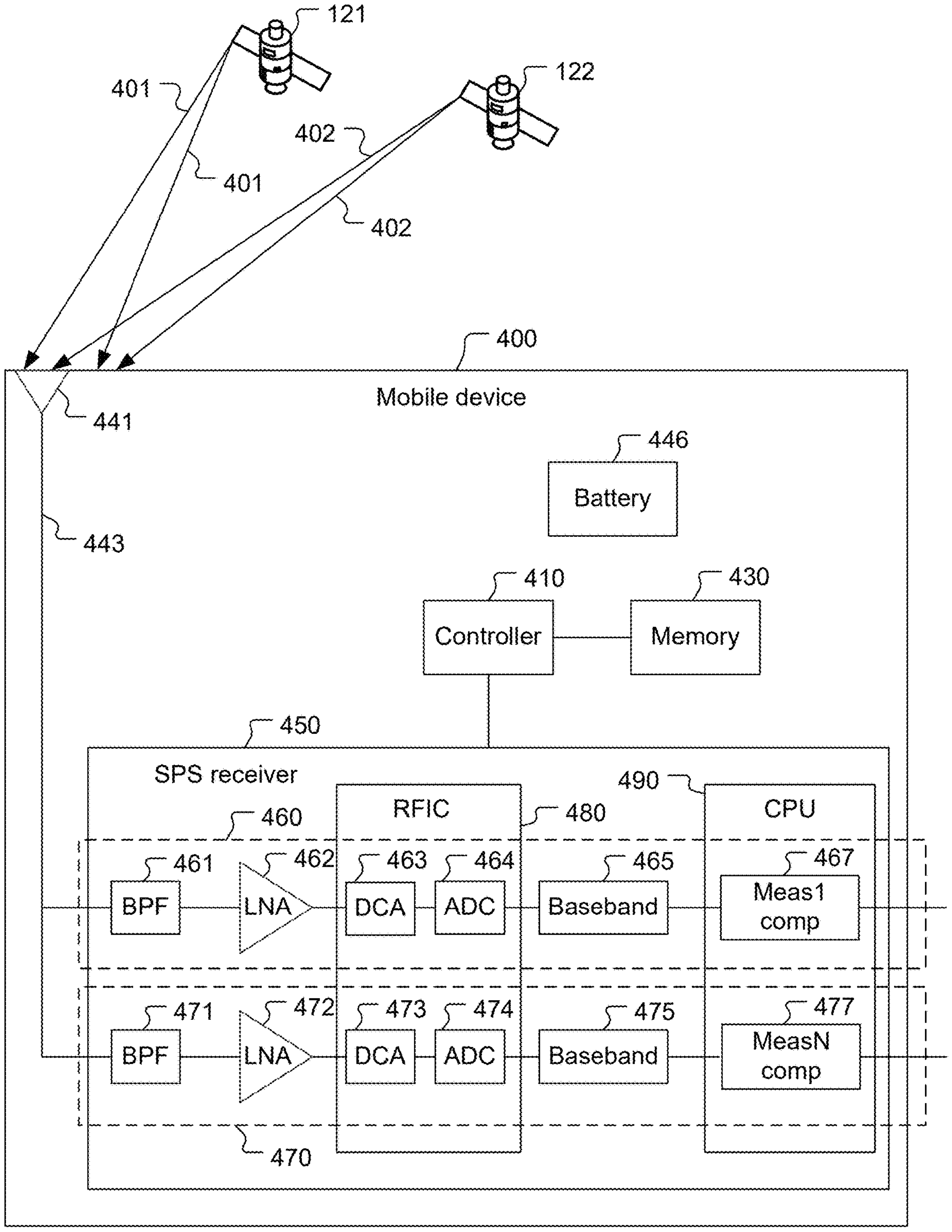
FIG. 4 is a block diagram of an example of the mobile device shown in FIG. 3, showing two Global Navigation Satellite System (GNSS) channels.

Referring also to FIG. 4, a mobile device 400, which is an example of the mobile device 300, includes a controller 410, a memory 430, antennas 441, 442, and a SPS receiver 450 communicatively coupled to each other, and a battery 446 connected to components of the mobile device 400 that use energy to operate. The controller 410 may be an example of the control unit 350 (possibly in combination with the memory 430) and the memory 430 may be an example of the memory 330. The controller 410 may be implemented by the processor 310 and is configured to control components of the SPS receiver 450, e.g., to control activation status of channels of the SPS receiver 450 (whether a component (including a portion of a component) is active (e.g., powered or enabled for operation) or inactive (e.g., unpowered or disabled from operation)). The controller 410 may control what SV signal each channel attempts to measure (e.g., what SV signal code to search for, e.g., what code to correlate with received SV signals). The antennas 441, 442 may be configured to transduce satellite signals (e.g., signals 401, 402 from the SVs 121, 122, respectively), possibly of different frequency bands, into electrical signals that are provided to the SPS receiver 450 via respective electrical signal lines 443, 444.

The SPS receiver 450 includes multiple GNSS channels 460, 470 (which may be called GNSS channels) for measuring satellite signals. Only two GNSS channels are shown for sake of simplicity of the figure, but more channels may be included, e.g., 40 channels, 50 channels, or another quantity of channels. The SPS receiver 450 will include fewer channels than for measuring all SV positioning signals for all SVs above the horizon.

Each of the GNSS channels 460, 470 includes respective components for measuring satellite signals, and may be connected to the same antenna, here the antenna 441. The GNSS channel 460 includes the antenna 441, may include a BPF 461 (bandpass filter), and includes an LNA 462 (low-noise amplifier), a DCA 463 (Digital Controlled Amplifier for down-conversion, signal conditioning/filtering, and amplification), an ADC 464 (analog-to-digital converter), and a baseband block 465. The BPF 461 is configured to pass signals of frequencies within a desired frequency band, e.g., the L1 band, with little if any attenuation, and to significantly attenuate signals of frequencies outside the desired frequency band of the BPF 461. The LNA 462 is configured to amplify signals passed by the BPF 461. The DCA 463 (which may be called a PGA (programmable gain amplifier)) is configured to down convert the analog amplified signals output by the LNA 462 to a baseband frequency, to perform signal conditioning and/or filtering (e.g., anti-aliasing filtering), and amplification in addition to the amplification by the LNA 462. The ADC 464, which here is a portion of an RFIC 480 (Radio Frequency Integrated Circuit), is configured to convert the analog signals output by the DCA 463 into digital signals. The baseband block 465 is configured to perform intense signal processing of correlating the digital signals output by the ADC 464 with respective reference pseudorandom signals (e.g., Gold codes) by integrating the signals (e.g., for 1 ms) and using the integrated signals for further processing to determine whether the correlation results have sufficient energy to indicate a true signal. A measurement generation block 467, which here is a portion of a CPU 490 (Central Processing Unit), may be configured to generate GNSS measurements based on the signal output by the baseband block 465 to determine one or more satellite signal parameters (e.g., pseudorange, $CN_0$ (carrier-to-noise-density ratio, also referred to as $C/N_0$), Doppler, carrier phase, etc.). The measurement generation block 467 comprises a portion of the CPU 490 for performing computations for the GNSS channel 460, namely corresponding to signals in the desired frequency band of the BPF 461. Thus, the measurement generation block 467 is shown as being for measurement 1 computation. The CPU 490 may be a portion of the processor 310. The GNSS channel 470 includes the shared antenna 441 (or a separate antenna), may include a BPF 471, and includes an LNA 472, a DCA 473, an ADC 474, a baseband block 475, and a measurement generation block 477. The BPF 471 is configured to pass signals of frequencies within a desired frequency band, e.g., the L2/L5 band, with little if any attenuation, and to significantly attenuate signals of frequencies outside the desired frequency band of the BPF 471. The LNA 472, DCA 473, ADC 474, baseband block 475, and measurement generation block 477 are configured similarly to the LNA 462, DCA 463, ADC 464, baseband block 465, and measurement generation block 467, but configured, as appropriate, for processing signals corresponding to signals of the desired frequency of the BPF 471. Thus, the measurement generation block 477 is shown as being for measurement N computation, as there may be N GNSS channels, with N being an integer of two or greater. The antennas 441, 442 may be configured to transduce satellite signals of respective frequency bands, and may thus have significantly different configurations. Other configurations may be used, e.g., with the SPS receiver 450 not including the BPFs 461, 471, and one of the antennas 441, 442 omitted, or both of the antennas 441, 442 configured to transduce signals in the same frequency range, or with more antennas included. Still other configurations may be used.

Figure 5:
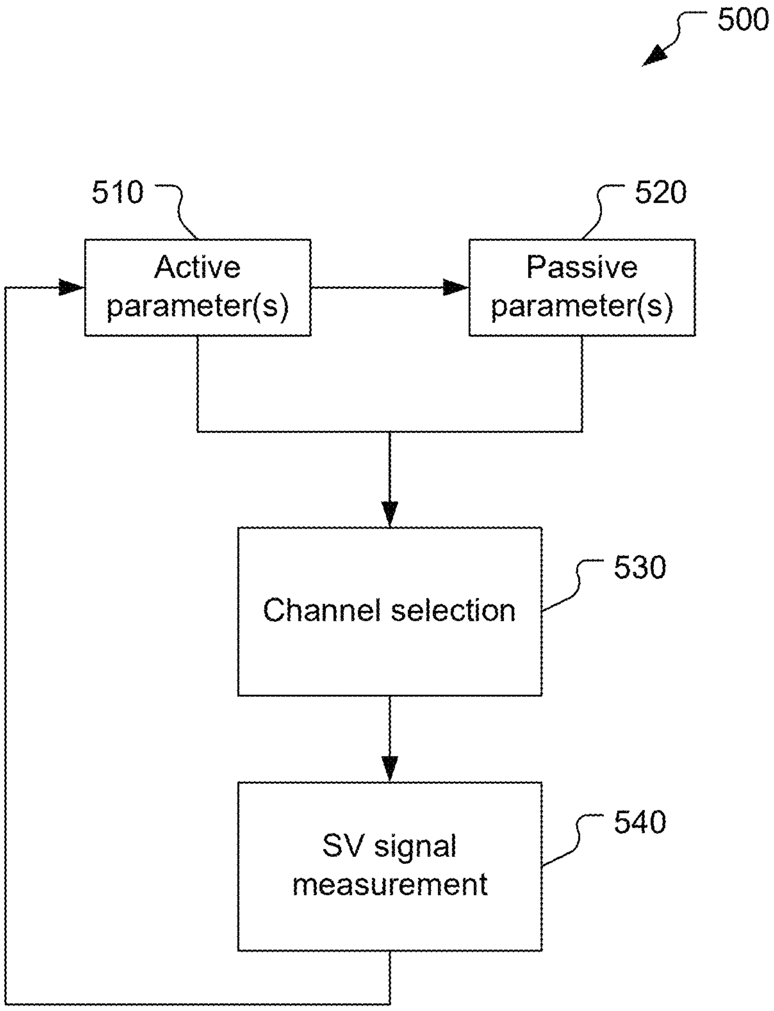
FIG. 5 is a block flow diagram of a method of measuring select satellite vehicle signals.

Referring also to FIG. 5, a method 500 of measuring select SV signals includes the stages shown. The method 500 is, however, an example only and not limiting. The method 500 may be altered, e.g., by having stages added, removed, rearranged, combined, performed concurrently, and/or having single stages split into multiple stages.

At stage 510, the method 500 may include obtaining one or more active parameters. For example, the control unit 350 may cause the SPS receiver 217 to measure one or more SV signals from one or more SVs that are above the horizon relative to the mobile device 300. The control unit 350 may determine a coarse location of the mobile device 300, e.g., using one or more communication signals and/or one or more positioning signals received via the interface 320. For example, the control unit 350 may use a location of a device (e.g., a base station, an access point, etc.) whose communication or positioning signal is received as the coarse location of the mobile device 300. As another example, the control unit 350 may use Enhanced Cell ID (E-CID) to determine the coarse location of the mobile device 300. As another example, the control unit 350 may use one or more images obtained by the camera 218 to recognize a geographical feature of known location and use that location, or an estimated location of the camera based on the location of the geographical feature, as the coarse location of the mobile device 300. Also or alternatively, one or more other techniques may be used to determine the coarse location of the mobile device. Based on the coarse location, the control unit 350 may use ephemeris information, stored in the memory 330) of satellite vehicles to determine which SVs are above a horizon of the Earth relative to the mobile device 300. The control unit 350 may cause the SPS receiver 217 to perform a fast scan to measure SV signals. The fast scan may be performed only for SV signals of SVs above the horizon relative to the mobile device 300, or may be performed for a subset of SV signals of SVs above the horizon, or may be performed for more SV signals (e.g., even for SVs below the horizon). The fast scan may be a quick, coarse granularity search for SV signals that uses a small amount of resources. Signal strength of received signals may be measured by the fast scan and stored, e.g., in the memory 330. As another example, a predicted measurement error may be calculated as an active parameter. Also or alternatively, one or more other active parameters may be determined. The same active parameter may not be determined for all received SV signals, such that an active parameter determined for one received SV signal may not be determined for another received SV signal. Active parameter value(s), e.g., measured signal strength(s) (e.g., $CN_0$(s) (carrier-to-noise-density ratio(s)), may be provided to the memory to replace corresponding previous passive parameter(s), e.g., previously-stored signal strength(s) of the same SV signal(s).

At stage 520, the method 500 may include obtaining one or more passive parameter(s). A passive parameter is a parameter that is available without a measurement, or at least without a new measurement. For example, the control unit 350 may retrieve ephemeris data from the memory 330, e.g., to determine an elevation angle relative to the mobile device 300 for each of one or more of the SVs that are above the horizon relative to the mobile device 300. As another example, the control unit 350 may obtain one or more previous active parameter value(s) corresponding to one or more SV signals and/or one or more SVs. The previous active parameter value(s) may now be stale, e.g., older than a threshold amount of time such as one second (1 s). For example, the control unit 350 may determine a previous signal strength indication (e.g., $CN_0$) for each of one or more signals corresponding to one or more potentially-visible SVs (i.e., SVs above the horizon). The control unit 350 may obtain different passive parameters for different SV signals and/or different SVs. The active parameter(s) and the passive parameter(s) are independent of a GNSS constellation or SV signal type.

At stage 530, the method includes channel selection. The control unit 350 may determine a subset of SV signals corresponding to potentially-visible SVs to measure and/or track and meeting a channel search capacity, e.g., a quantity of the SV signals in the subset being equal to a less than a quantity of available GNSS channels for SV signal measurement/tracking. For example, the control unit 350 may use one or more active parameters (each corresponding to an SV signal and/or an SV) and/or one or more passive parameters (each corresponding to an SV signal and/or an SV) to determine SV signals to be measured and to select GNSS channels for measuring the SV signals determined to be measured. The SV signals determined to be measured may comprise fewer SV signals than are transmitted by the SVs above the horizon. The control unit 350 may, for example, eliminate SV signals corresponding to SVs below a threshold elevation (e.g., below) 30° from being among the SV signals determined to be measured. As another example, the control unit 350 may eliminate any SV signal with a signal strength indication (e.g., $CN_0$) below a threshold signal strength from being among the SV signals determined to be measured. As another example, the control unit 350 may eliminate any SV signal determined to be multipath (e.g., determined using one or more well-known techniques) or redundant from being among the SV signals determined to be measured. The control unit 350 may implement an algorithm (e.g., a machine-learning model) to consider one or more parameters (e.g., one or more active parameters and/or one or more passive parameters) to determine a set of candidate SV signals for possible measurement. The set of candidate SV signals will not include any eliminated SV signals. A quantity, S, of SV signals in the set of candidate SV signals will be smaller than a quantity, P, of SV signals corresponding to the potentially-visible SVs (i.e., $S<P$). The quantity S of SV signals in the set of candidate SV signals may be larger than a quantity, C, of GNSS channels of the mobile device 300. The control unit 350 may select all of the GNSS channels to attempt to measure respective SV signals, e.g., if $S>C$. The control unit 350 may, however, select fewer than all of the GNSS channels to attempt to measure respective SV signals even if $S>C$.

The control unit 350 may be configured according to one or more techniques to assign GNSS channels to attempt to measure/track respective SV signals. For example, the control unit 350 may be configured to randomly assign each available GNSS channel of the mobile device 300 to a candidate SV signal, or to randomly assign each available GNSS channel of the mobile device 300 to a candidate SV signal that meets one or more criteria (e.g., signal strength above a signal strength threshold). As another example, referring also to FIG. 6, the control unit 350 may be configured to rank the candidate SV signals based on one or more parameters. For example, the control unit 350 may be configured to rank the candidate SV signals in order of signal strength, or in order of elevation, or in order of predicted measurement error, or in order of a metric determined using one or more parameters. A value of the metric may be an indication of a usefulness and/or quality of the corresponding SV positioning signal, e.g., corresponding to an ability of the mobile device to accurately measure the SV positioning signal and likelihood of the SV positioning signal being from an SV that is LOS with the mobile device 300. The control unit 350 may determine a value of the metric for each candidate SV signal, and may determine the value of the metric using the available parameter(s) for each candidate SV signal even though different candidate SV signals may have different parameters available (e.g., $CN_0$ for one candidate SV signal, elevation for another candidate SV signal, predicted measurement error available for another candidate SV signal, and a combination of parameters available for another candidate SV signal). For example, an SV at a higher elevation may result in a higher metric value for an SV signal transmitted by that SV and/or a higher received signal strength indication may result in a higher metric value for that SV signal. The metric may be determined, for example, as a normalized weighted sum of parameter value(s) for each SV signal. As shown in FIG. 6, the control unit 350 may determine a logical set 610 of candidate SV signals and corresponding metric values, with the logical set 610 being ranked by the metric values. The set 610 is a logical set in that the candidate SV signal IDs and metric values may not be physically stored in memory locations in the ranked order, but are ordered for purposes of GNSS channel assignment. Here, there are N candidate SV signals and the candidate SV signals each have a corresponding ID. The set 610 is shown with the ID numbers and metric values indicated generically. The control unit 350 may assign GNSS channels to candidate SV signals in order of the ranking until a desired quantity of GNSS channels (e.g., all of the GNSS channels) have been assigned. For example, as indicated by a table 620, the control unit 350 has assigned the 50 highest-ranked candidate SV signals to 50 GNSS channels of the mobile device 300. The 50 GNSS channels may be all of the GNSS channels of the mobile device 300, or all of the presently available GNSS channels of the mobile device. Alternatively, as indicated by optional table portion 630, there may be more than 50 GNSS channels (80 channels in this example) available in the mobile device 300 for assignment but the control unit 350 may assign less than all of the available GNSS channels, in this example 50 GNSS channels of the 80 available GNSS channels.

At stage 540, the method 500 includes SV signal measurement. For example, the selected GNSS channels assigned to the selected SV signals are used to attempt to measure the selected SV signals, e.g., the GNSS channels are turned ON and used to search for respective codes of the selected SV signals. A GNSS measurement engine, e.g., the GNSS channels such as the GNSS channels 460, 470, may generate measurements of the selected SV signals. These measurements may be used, e.g., by the processor 310, to determine a location (i.e., a position fix) of the mobile device 300, e.g., by determining ranges to respective SVs and trilateration using the ranges and known locations of the SVs.

Figure 7:
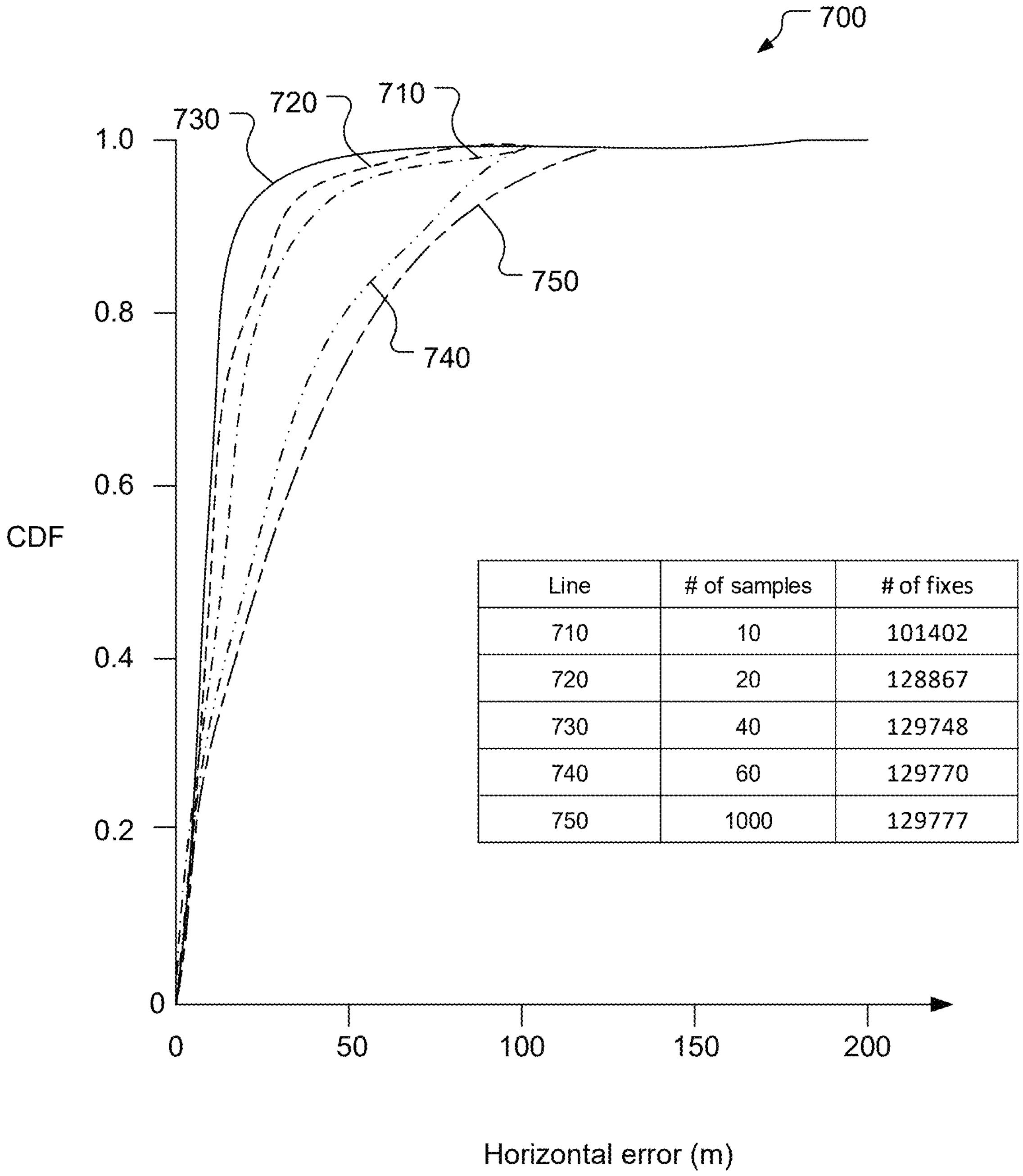
FIG. 7 is a plot of cumulative distribution functions as a function of horizontal positioning error.

Dynamic allocation of limited GNSS channels may provide one or more of various advantages. For example, the limited GNSS channels may be efficiently distributed among different GNSS constellations/signal types that vary depending on a surrounding environment of the mobile device 300. GNSS channel selection as discussed above allows assessment of suitability of SV positioning signals and may prioritize GNSS channel assignment prior to deep SV signal search (i.e., higher-granularity searching that the fast scan), which may facilitate or even enable more efficient GNSS channel assignment. Position fixes may be obtained for a mobile device using fewer GNSS channels than (limited GNSS channel capacity compared to) previous devices, e.g., fewer GNSS channels than for attempting to measure all potentially in-view satellite vehicles, without significantly reducing position fix accuracy, or even improving position fix accuracy. For example, as shown in FIG. 7, a graph 700 of theoretical CDF as a function of horizontal error for different quantities of samples (GNSS channels) shows that as the number of samples decreases from 1,000 to 20, horizontal error decreases without significant reduction in the number of position fixes. The improved horizontal accuracy may be due, at least in part, to eliminating the use of bad SV signals. With fewer GNSS channels used, mobile devices may be made with fewer GNSS channels such that the cost of manufacturing and/or operating a mobile device may be reduced without significantly reducing position fix accuracy, or even improving position fix accuracy.

Figure 8:
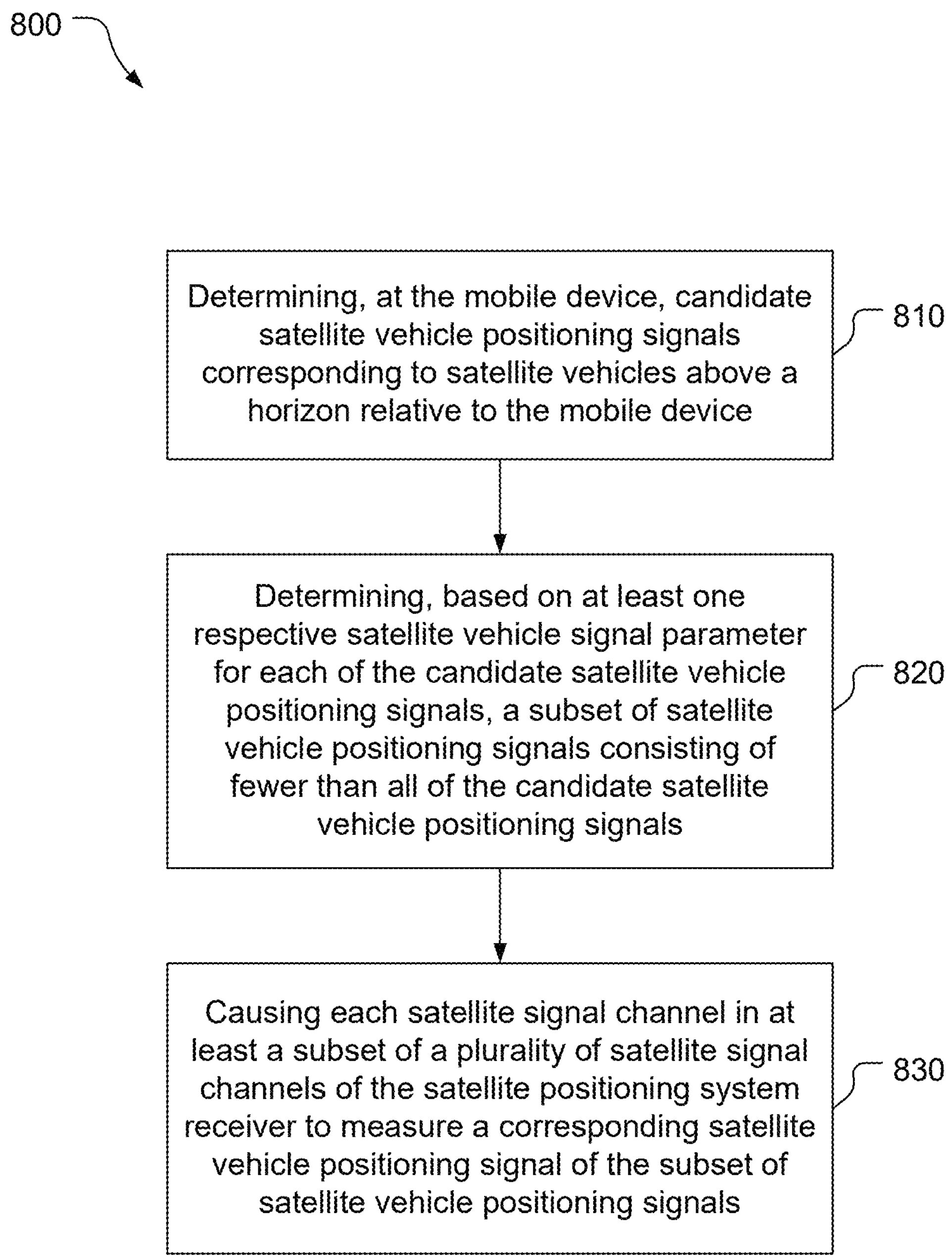
FIG. 8 is a block diagram of a method of controlling a satellite positioning system receiver of a mobile device.

Referring to FIG. 8, with further reference to FIGS. 1-7, method 800 of controlling a satellite positioning system receiver of a mobile device includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes determining, at the mobile device, candidate satellite vehicle positioning signals corresponding to satellite vehicles above a horizon relative to the mobile device. For example, the control unit 350 may determine a coarse location of the mobile device 300 (e.g., using E-CID and/or another known technique), and use ephemeris data of SVs to determine the SVs that are above the horizon relative to the mobile device 300, and the SV signals transmitted by those SVs. The processor 310, possibly in combination with the memory 330, possibly in combination with the interface 320 (e.g., the wireless receiver 244 and the antenna 246) may comprise means for determining the candidate satellite vehicle positioning signals.

At stage 820, the method 800 includes determining, based on at least one respective satellite vehicle signal parameter for each of the candidate satellite vehicle positioning signals, a subset of satellite vehicle positioning signals consisting of fewer than all of the candidate satellite vehicle positioning signals. For example, at stage 530 of the method 500, the control unit 350 may use one or more active parameters and/or one or more passive parameters to determine a subset of the candidate satellite vehicle positioning signals. The control unit 350 may analyze a different parameter set for different satellite vehicle positioning signals, with each parameter set comprising at least one parameter. The control unit 350 may, for example, determine a subset consisting of the 50 candidate SV signals with candidate SV signal IDs ID1-ID50 as shown in FIG. 6. The processor 310, possibly in combination with the memory 330, possibly in combination with the interface 320 (e.g., the SPS receiver 217 for performing a fast scan) may comprise means for determining the subset of SV positioning signals.

At stage 830, the method 800 includes causing each satellite signal channel in at least a subset of a plurality of satellite signal channels of the satellite positioning system receiver to measure a corresponding satellite vehicle positioning signal of the subset of satellite vehicle positioning signals. For example, the control unit 350 may cause the interface 320, e.g., the GNSS channels GC1-GC50 to measure the SV signals ID1-ID50 (e.g., searching the appropriate frequency for the appropriate code). The processor 310, possibly in combination with the memory 330, may comprise means for causing each satellite signal channel in at least a subset of a plurality of satellite signal channels of the satellite positioning system receiver to measure a corresponding satellite vehicle positioning signal of the subset of satellite vehicle positioning signals.

Implementations of the method 800 may include one or more of the following features. In an example implementation, the method 800 includes ranking satellite vehicle positioning signals of the subset of satellite vehicle positioning signals based on the at least one respective satellite vehicle signal parameter for each of the candidate satellite vehicle positioning signals. For example, as shown in the logical set 610, the control unit 350 may rank (order) the candidate SV signals, e.g., according to metric values associated with the candidate SV signals. The processor 310, possibly in combination with the memory 330, may comprise means for ranking satellite vehicle positioning signals.

In a further example implementation, the at least a subset of the plurality of satellite signal channels comprises N satellite signal channels and wherein causing each satellite signal channel to measure a corresponding satellite vehicle positioning signal comprises causing each satellite signal channel in the at least a subset of the plurality of satellite signal channels to measure one of N highest-ranked satellite vehicle positioning signals of the subset of satellite vehicle positioning signals. For example, again as shown in FIG. 6, the control unit may cause 50 GNSS channels to measure the 50 highest-ranked candidate SV signals. The processor 310, possibly in combination with the memory 330, may comprise means for causing each satellite signal channel in the at least a subset of the plurality of satellite signal channels to measure one of N highest-ranked satellite vehicle positioning signals of the subset of satellite vehicle positioning signals.

Also or alternatively, implementations of the method 800 may include one or more of the following features. In an example implementation, a set comprising the at least one respective satellite vehicle signal parameter for each of the candidate satellite vehicle positioning signals comprises at least one measure of signal strength of a respective at least one satellite vehicle positioning signal of the subset of satellite vehicle positioning signals. For example, the control unit 350 may use an indication of signal strength (e.g., $CN_0$) as a parameter for determining candidate SV signals to measure, with the indication of signal strength being a current/fresh indication (e.g., measured within one second of a present time) or a previous/stale indication (e.g., measured more than one second before a present time). In another example implementation, a set comprising the at least one respective satellite vehicle signal parameter for each of the candidate satellite vehicle positioning signals comprises at least one indication of satellite vehicle elevation relative to the mobile device of a respective at least one of the satellite vehicles of the subset of satellite vehicle positioning signals. For example, the control unit 350 may determine an SV elevation based on a coarse location of the mobile device 300 and ephemeris data indicative of SV locations relative to the Earth as a function of time. The control unit 350 may use the elevation to determine whether to measure one or more candidate SV signals. In another example implementation, the at least one respective satellite vehicle signal parameter for a first one of the candidate satellite vehicle positioning signals is different from the at least one respective satellite vehicle signal parameter for a second one of the candidate satellite vehicle positioning signals. For example, different candidate SV signals may have different associated (e.g., available) sets of parameters. For example, a current signal strength may be available for one candidate SV signal, and an elevation available for another candidate SV signal, and a stale signal strength and elevation available for yet another candidate SV signal. Other examples of available parameters for candidate SV signals are possible. In another example implementation, a set comprising the at least one respective satellite vehicle signal parameter for each of the candidate satellite vehicle positioning signals comprises at least one first parameter, based on a first coarse granularity measurement made of one of the candidate satellite vehicle positioning signals less than a threshold amount of time before a present time, and at least one second parameter comprising a satellite vehicle elevation relative to the mobile device or a second coarse granularity measurement made of one of the candidate satellite vehicle positioning signals more than the threshold amount of time before the present time. A SV signal parameter set may comprise, for example, a current/fresh signal strength measurement based on a fast scan, and an SV elevation and/or a previous/state signal strength indication, and the control unit 350 may use this information to determine whether to measure one or more candidate SV signals (e.g., whether to measure a candidate SV signal associated with the SV signal parameter set and/or whether to measure another candidate SV signal).

IMPLEMENTATION EXAMPLES

Implementation examples are provided in the following numbered clauses.

Clause 1. A method of controlling a satellite positioning system receiver of a mobile device, the method comprising:

determining, at the mobile device, candidate satellite vehicle positioning signals corresponding to satellite vehicles above a horizon relative to the mobile device;

determining, based on at least one respective satellite vehicle signal parameter for each of the candidate satellite vehicle positioning signals, a subset of satellite vehicle positioning signals consisting of fewer than all of the candidate satellite vehicle positioning signals; and causing each satellite signal channel in at least a subset of a plurality of satellite signal channels of the satellite positioning system receiver to measure a corresponding satellite vehicle positioning signal of the subset of satellite vehicle positioning signals.

Clause 2. The method of clause 1, further comprising ranking satellite vehicle positioning signals of the subset of satellite vehicle positioning signals based on the at least one respective satellite vehicle signal parameter for each of the candidate satellite vehicle positioning signals.

Clause 3. The method of clause 2, wherein the at least a subset of the plurality of satellite signal channels comprises N satellite signal channels and wherein causing each satellite signal channel in the at least a subset of the plurality of satellite signal channels to measure a corresponding satellite vehicle positioning signal comprises causing each satellite signal channel in the at least a subset of the plurality of satellite signal channels to measure one of N highest-ranked satellite vehicle positioning signals of the subset of satellite vehicle positioning signals.

Clause 4. The method of any of clauses 1-3, wherein a set comprising the at least one respective satellite vehicle signal parameter for each of the candidate satellite vehicle positioning signals comprises at least one measure of signal strength of a respective at least one satellite vehicle positioning signal of the subset of satellite vehicle positioning signals.

Clause 5. The method of any of clauses 1-4, wherein a set comprising the at least one respective satellite vehicle signal parameter for each of the candidate satellite vehicle positioning signals comprises at least one indication of satellite vehicle elevation relative to the mobile device of a respective at least one of the satellite vehicles of the subset of satellite vehicle positioning signals.

Clause 6. The method of any of clauses 1-5, wherein the at least one respective satellite vehicle signal parameter for a first one of the candidate satellite vehicle positioning signals is different from the at least one respective satellite vehicle signal parameter for a second one of the candidate satellite vehicle positioning signals.

Clause 7. The method of any of clauses 1-6, wherein a set comprising the at least one respective satellite vehicle signal parameter for each of the candidate satellite vehicle positioning signals comprises at least one first parameter, based on a first coarse granularity measurement made of one of the candidate satellite vehicle positioning signals less than a threshold amount of time before a present time, and at least one second parameter comprising a satellite vehicle elevation relative to the mobile device or a second coarse granularity measurement made of one of the candidate satellite vehicle positioning signals more than the threshold amount of time before the present time.

Clause 8. A mobile device comprising:

at least one memory;

a satellite positioning system receiver comprising a plurality of satellite signal channels each comprising a combination of components to receive and measure a satellite vehicle positioning signal;

at least one controller, communicatively coupled to the at least one memory and the satellite positioning system receiver, configured to:

determine candidate satellite vehicle positioning signals corresponding to satellite vehicles above a horizon relative to the mobile device;

determine, based on at least one respective satellite vehicle signal parameter for each of the candidate satellite vehicle positioning signals, a subset of satellite vehicle positioning signals consisting of fewer than all of the candidate satellite vehicle positioning signals; and cause each satellite signal channel in at least a subset of the plurality of satellite signal channels to measure a corresponding satellite vehicle positioning signal of the subset of satellite vehicle positioning signals.

Clause 9. The mobile device of clause 8, wherein the at least one controller is further configured to rank satellite vehicle positioning signals of the subset of satellite vehicle positioning signals based on the at least one respective satellite vehicle signal parameter for each of the candidate satellite vehicle positioning signals.

Clause 10. The mobile device of clause 9, wherein the at least a subset of the plurality of satellite signal channels comprises N satellite signal channels and wherein the at least one controller is further configured to cause each satellite signal channel in the at least a subset of the plurality of satellite signal channels to measure one of N highest-ranked satellite vehicle positioning signals of the subset of satellite vehicle positioning signals.

Clause 11. The mobile device of any of clauses 8-10, wherein a set comprising the at least one respective satellite vehicle signal parameter for each of the candidate satellite vehicle positioning signals comprises at least one measure of signal strength of a respective at least one satellite vehicle positioning signal of the subset of satellite vehicle positioning signals.

Clause 12. The mobile device of any of clauses 8-11, wherein a set comprising the at least one respective satellite vehicle signal parameter for each of the candidate satellite vehicle positioning signals comprises at least one indication of satellite vehicle elevation relative to the mobile device of a respective at least one of the satellite vehicles of the subset of satellite vehicle positioning signals.

Clause 13. The mobile device of any of clauses 8-12, wherein the at least one respective satellite vehicle signal parameter for a first one of the candidate satellite vehicle positioning signals is different from the at least one respective satellite vehicle signal parameter for a second one of the candidate satellite vehicle positioning signals.

Clause 14. The mobile device of any of clauses 8-13, wherein a set comprising the at least one respective satellite vehicle signal parameter for each of the candidate satellite vehicle positioning signals comprises at least one first parameter, based on a first coarse granularity measurement made of one of the candidate satellite vehicle positioning signals less than a threshold amount of time before a present time, and at least one second parameter comprising a satellite vehicle elevation relative to the mobile device or a second coarse granularity measurement made of one of the candidate satellite vehicle positioning signals more than the threshold amount of time before the present time.

Clause 15. A mobile device comprising:

a satellite positioning system receiver comprising a plurality of satellite signal channels each comprising a combination of components to receive and measure a satellite vehicle positioning signal;

means for determining candidate satellite vehicle positioning signals corresponding to satellite vehicles above a horizon relative to the mobile device;

means for determining, based on at least one respective satellite vehicle signal parameter for each of the candidate satellite vehicle positioning signals, a subset of satellite vehicle positioning signals consisting of fewer than all of the candidate satellite vehicle positioning signals; and means for causing each satellite signal channel in at least a subset of the plurality of satellite signal channels of the satellite positioning system receiver to measure a corresponding satellite vehicle positioning signal of the subset of satellite vehicle positioning signals.

Clause 16. The mobile device of clause 15, further comprising means for ranking satellite vehicle positioning signals of the subset of satellite vehicle positioning signals based on the at least one respective satellite vehicle signal parameter for each of the candidate satellite vehicle positioning signals.

Clause 17. The mobile device of clause 16, wherein the at least a subset of the plurality of satellite signal channels comprises N satellite signal channels and wherein the means for causing each satellite signal channel in the at least a subset of the plurality of satellite signal channels to measure a corresponding satellite vehicle positioning signal comprise means for causing each satellite signal channel in the at least a subset of the plurality of satellite signal channels to measure one of N highest-ranked satellite vehicle positioning signals of the subset of satellite vehicle positioning signals.

Clause 18. The mobile device of any of clauses 15-17, wherein a set comprising the at least one respective satellite vehicle signal parameter for each of the candidate satellite vehicle positioning signals comprises at least one measure of signal strength of a respective at least one satellite vehicle positioning signal of the subset of satellite vehicle positioning signals.

Clause 19. The mobile device of any of clauses 15-18, wherein a set comprising the at least one respective satellite vehicle signal parameter for each of the candidate satellite vehicle positioning signals comprises at least one indication of satellite vehicle elevation relative to the mobile device of a respective at least one of the satellite vehicles of the subset of satellite vehicle positioning signals.

Clause 20. The mobile device of any of clauses 15-19, wherein the at least one respective satellite vehicle signal parameter for a first one of the candidate satellite vehicle positioning signals is different from the at least one respective satellite vehicle signal parameter for a second one of the candidate satellite vehicle positioning signals.

Clause 21. The mobile device of any of clauses 15-20, wherein a set comprising the at least one respective satellite vehicle signal parameter for each of the candidate satellite vehicle positioning signals comprises at least one first parameter, based on a first coarse granularity measurement made of one of the candidate satellite vehicle positioning signals less than a threshold amount of time before a present time, and at least one second parameter comprising a satellite vehicle elevation relative to the mobile device or a second coarse granularity measurement made of one of the candidate satellite vehicle positioning signals more than the threshold amount of time before the present time.

Clause 22. A non-transitory, processor-readable storage medium comprising processor-readable instructions to cause at least one processor of a mobile device to:

determine candidate satellite vehicle positioning signals corresponding to satellite vehicles above a horizon relative to the mobile device;

determine, based on at least one respective satellite vehicle signal parameter for each of the candidate satellite vehicle positioning signals, a subset of satellite vehicle positioning signals consisting of fewer than all of the candidate satellite vehicle positioning signals; and cause each satellite signal channel in at least a subset of a plurality of satellite signal channels of a satellite positioning system receiver of the mobile device to measure a corresponding satellite vehicle positioning signal of the subset of satellite vehicle positioning signals.

Clause 23. The non-transitory, processor-readable storage medium of clause 22, further comprising processor-readable instructions to cause the at least one processor to rank satellite vehicle positioning signals of the subset of satellite vehicle positioning signals based on the at least one respective satellite vehicle signal parameter for each of the candidate satellite vehicle positioning signals.

Clause 24. The non-transitory, processor-readable storage medium of clause 23, wherein the at least a subset of the plurality of satellite signal channels comprises N satellite signal channels and wherein the processor-readable instructions to cause the at least one processor to cause each satellite signal channel in the at least a subset of the plurality of satellite signal channels to measure a corresponding satellite vehicle positioning signal comprise processor-readable instructions to cause the at least one processor to cause each satellite signal channel in the at least a subset of the plurality of satellite signal channels to measure one of N highest-ranked satellite vehicle positioning signals of the subset of satellite vehicle positioning signals.

Clause 25. The non-transitory, processor-readable storage medium of any of clauses 22-24, wherein a set comprising the at least one respective satellite vehicle signal parameter for each of the candidate satellite vehicle positioning signals comprises at least one measure of signal strength of a respective at least one satellite vehicle positioning signal of the subset of satellite vehicle positioning signals.

Clause 26. The non-transitory, processor-readable storage medium of any of clauses 22-25, wherein a set comprising the at least one respective satellite vehicle signal parameter for each of the candidate satellite vehicle positioning signals comprises at least one indication of satellite vehicle elevation relative to the mobile device of a respective at least one of the satellite vehicles of the subset of satellite vehicle positioning signals.

Clause 27. The non-transitory, processor-readable storage medium of any of clauses 22-26, wherein the at least one respective satellite vehicle signal parameter for a first one of the candidate satellite vehicle positioning signals is different from the at least one respective satellite vehicle signal parameter for a second one of the candidate satellite vehicle positioning signals.

Clause 28. The non-transitory, processor-readable storage medium of any of clauses 22-27, wherein a set comprising the at least one respective satellite vehicle signal parameter for each of the candidate satellite vehicle positioning signals comprises at least one first parameter, based on a first coarse granularity measurement made of one of the candidate satellite vehicle positioning signals less than a threshold amount of time before a present time, and at least one second parameter comprising a satellite vehicle elevation relative to the mobile device or a second coarse granularity measurement made of one of the candidate satellite vehicle positioning signals more than the threshold amount of time before the present time.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors. Also, a "set" as used herein includes one or more members.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of controlling a satellite positioning system receiver of a mobile device, the method comprising:

determining, at the mobile device, candidate satellite vehicle positioning signals corresponding to satellite vehicles above a horizon relative to the mobile device;

determining, based on a plurality of satellite vehicle signal parameters for each of the candidate satellite vehicle positioning signals, a subset of satellite vehicle positioning signals consisting of fewer than all of the candidate satellite vehicle positioning signals, wherein the plurality of satellite vehicle signal parameters for each candidate satellite vehicle positioning signal comprises:

at least one first parameter based on a first coarse granularity measurement made less than a threshold amount of time before a present time, and at least one second parameter comprising a satellite vehicle elevation relative to the mobile device, or a second coarse granularity measurement made of one of the candidate satellite vehicle positioning signals more than the threshold amount of time before the present time; and causing each satellite signal channel in at least a subset of a plurality of satellite signal channels of the satellite positioning system receiver to measure a corresponding satellite vehicle positioning signal of the subset of satellite vehicle positioning signals.

2. The method of claim 1, further comprising ranking satellite vehicle positioning signals of the subset of satellite vehicle positioning signals based on the plurality of satellite vehicle signal parameters for each of the candidate satellite vehicle positioning signals.

3. The method of claim 2, wherein the at least a subset of the plurality of satellite signal channels comprises N satellite signal channels and wherein causing each satellite signal channel in the at least a subset of the plurality of satellite signal channels to measure a corresponding satellite vehicle positioning signal comprises causing each satellite signal channel in the at least a subset of the plurality of satellite signal channels to measure one of N highest-ranked satellite vehicle positioning signals of the subset of satellite vehicle positioning signals.

4. The method of claim 1, wherein a set comprising the plurality of satellite vehicle signal parameters for each of the candidate satellite vehicle positioning signals comprises at least one measure of signal strength of a respective at least one satellite vehicle positioning signal of the subset of satellite vehicle positioning signals.

5. The method of claim 1, wherein a set comprising the plurality of satellite vehicle signal parameters for each of the candidate satellite vehicle positioning signals comprises at least one indication of satellite vehicle elevation relative to the mobile device of a respective at least one of the satellite vehicles of the subset of satellite vehicle positioning signals.

6. The method of claim 1, wherein at least one of the plurality of satellite vehicle signal parameters for a first one of the candidate satellite vehicle positioning signals is different from the plurality of satellite vehicle signal parameters for a second one of the candidate satellite vehicle positioning signals.

7. A mobile device comprising:

at least one memory;

a satellite positioning system receiver comprising a plurality of satellite signal channels each comprising a combination of components to receive and measure a satellite vehicle positioning signal;

at least one controller, communicatively coupled to the at least one memory and the satellite positioning system receiver, configured to:

determine candidate satellite vehicle positioning signals corresponding to satellite vehicles above a horizon relative to the mobile device;

determine, based on a plurality of satellite vehicle signal parameters for each of the candidate satellite vehicle positioning signals, a subset of satellite vehicle positioning signals consisting of fewer than all of the candidate satellite vehicle positioning signals, wherein the plurality of satellite vehicle signal parameters for each candidate satellite vehicle positioning signal comprises:

at least one first parameter based on a first coarse granularity measurement made less than a threshold amount of time before a present time, and at least one second parameter comprising a satellite vehicle elevation relative to the mobile device, or a second coarse granularity measurement made of one of the candidate satellite vehicle positioning signals more than the threshold amount of time before the present time; and cause each satellite signal channel in at least a subset of the plurality of satellite signal channels to measure a corresponding satellite vehicle positioning signal of the subset of satellite vehicle positioning signals.

8. The mobile device of claim 7, wherein the at least one controller is further configured to rank satellite vehicle positioning signals of the subset of satellite vehicle positioning signals based on the plurality of satellite vehicle signal parameters for each of the candidate satellite vehicle positioning signals.

9. The mobile device of claim 8, wherein the at least a subset of the plurality of satellite signal channels comprises N satellite signal channels and wherein the at least one controller is further configured to cause each satellite signal channel in the at least a subset of the plurality of satellite signal channels to measure one of N highest-ranked satellite vehicle positioning signals of the subset of satellite vehicle positioning signals.

10. The mobile device of claim 7, wherein a set comprising the plurality of satellite vehicle signal parameters for each of the candidate satellite vehicle positioning signals comprises at least one measure of signal strength of a respective at least one satellite vehicle positioning signal of the subset of satellite vehicle positioning signals.

11. The mobile device of claim 7, wherein a set comprising the plurality of satellite vehicle signal parameters for each of the candidate satellite vehicle positioning signals comprises at least one indication of satellite vehicle elevation relative to the mobile device of a respective at least one of the satellite vehicles of the subset of satellite vehicle positioning signals.

12. The mobile device of claim 7, wherein at least one of the plurality of satellite vehicle signal parameters for a first one of the candidate satellite vehicle positioning signals is different from the plurality of satellite vehicle signal parameters for a second one of the candidate satellite vehicle positioning signals.

13. A mobile device comprising:

a satellite positioning system receiver comprising a plurality of satellite signal channels each comprising a combination of components to receive and measure a satellite vehicle positioning signal;

means for determining candidate satellite vehicle positioning signals corresponding to satellite vehicles above a horizon relative to the mobile device;

means for determining, based on a plurality of satellite vehicle signal parameters for each of the candidate satellite vehicle positioning signals, a subset of satellite vehicle positioning signals consisting of fewer than all of the candidate satellite vehicle positioning signals, wherein the plurality of satellite vehicle signal parameters for each candidate satellite vehicle positioning signal comprises:

at least one first parameter based on a first coarse granularity measurement made less than a threshold amount of time before a present time, and at least one second parameter comprising a satellite vehicle elevation relative to the mobile device, or a second coarse granularity measurement made of one of the candidate satellite vehicle positioning signals more than the threshold amount of time before the present time; and means for causing each satellite signal channel in at least a subset of the plurality of satellite signal channels of the satellite positioning system receiver to measure a corresponding satellite vehicle positioning signal of the subset of satellite vehicle positioning signals.

14. The mobile device of claim 13, further comprising means for ranking satellite vehicle positioning signals of the subset of satellite vehicle positioning signals based on the plurality of satellite vehicle signal parameters for each of the candidate satellite vehicle positioning signals.

15. The mobile device of claim 14, wherein the at least a subset of the plurality of satellite signal channels comprises N satellite signal channels and wherein the means for causing each satellite signal channel in the at least a subset of the plurality of satellite signal channels to measure a corresponding satellite vehicle positioning signal comprise means for causing each satellite signal channel in the at least a subset of the plurality of satellite signal channels to measure one of N highest-ranked satellite vehicle positioning signals of the subset of satellite vehicle positioning signals.

16. The mobile device of claim 13, wherein a set comprising the plurality of satellite vehicle signal parameters for each of the candidate satellite vehicle positioning signals comprises at least one measure of signal strength of a respective at least one satellite vehicle positioning signal of the subset of satellite vehicle positioning signals.

17. The mobile device of claim 13, wherein a set comprising the plurality of satellite vehicle signal parameters for each of the candidate satellite vehicle positioning signals comprises at least one indication of satellite vehicle elevation relative to the mobile device of a respective at least one of the satellite vehicles of the subset of satellite vehicle positioning signals.

18. The mobile device of claim 13, wherein at least one of the plurality of satellite vehicle signal parameters for a first one of the candidate satellite vehicle positioning signals is different from the plurality of satellite vehicle signal parameters for a second one of the candidate satellite vehicle positioning signals.

* * * * *